(12) United States Patent
Masuo et al.

(10) Patent No.: US 11,182,287 B2
(45) Date of Patent: Nov. 23, 2021

(54) MEMORY SYSTEM AND GARBAGE COLLECTION CONTROL METHOD

(71) Applicant: Kioxia Corporation, Minato-ku (JP)

(72) Inventors: Yoko Masuo, Iruma (JP); Yosuke Mitsumasu, Hadano (JP); Kazuya Kitsunai, Fujisawa (JP)

(73) Assignee: Kioxia Corporation, Minato-ku (JP)

( * ) Notice: Subject to any disclaimer, the term of this patent is extended or adjusted under 35 U.S.C. 154(b) by 0 days.

(21) Appl. No.: 16/787,133

(22) Filed: Feb. 11, 2020

(65) Prior Publication Data

US 2021/0073118 A1 Mar. 11, 2021

(30) Foreign Application Priority Data

Sep. 9, 2019 (JP) .............................. JP2019-163806

(51) Int. Cl.
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0608* (2013.01); *G06F 3/0647* (2013.01); *G06F 3/0659* (2013.01); *G06F 3/0679* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 2012/0066438 A1* | 3/2012 | Yoon .................... | G06F 12/0246 711/103 |
| 2016/0188220 A1 | 6/2016 | Nemoto et al. | |
| 2017/0329532 A1 | 11/2017 | Goss et al. | |
| 2018/0253347 A1* | 9/2018 | Shigeta ............... | G06F 11/1004 |
| 2018/0275911 A1 | 9/2018 | Nakazumi | |
| 2019/0079697 A1* | 3/2019 | Suzuki .................. | G06F 3/0679 |

FOREIGN PATENT DOCUMENTS

JP 2016-122227 A 7/2016

* cited by examiner

*Primary Examiner* — Kevin Verbrugge
(74) *Attorney, Agent, or Firm* — Oblon, McClelland, Maier & Neustadt, L.L.P.

(57) ABSTRACT

According to one embodiment, a memory system includes a nonvolatile memory and a controller. The nonvolatile memory includes a plurality of blocks. The controller controls an operation of writing data to the nonvolatile memory and an operation of reading data to the nonvolatile memory. The controller includes a first processor and a second processor. The first processor executes a first process of creating one or more free blocks by transferring valid data in N blocks (where N is a natural number greater than or equal to two) to blocks of number less than N. The second processor executes a second process of transferring valid data including data which needs refresh in M blocks (where M is a natural number greater than or equal to one) to blocks of number less than or equal to M.

20 Claims, 7 Drawing Sheets

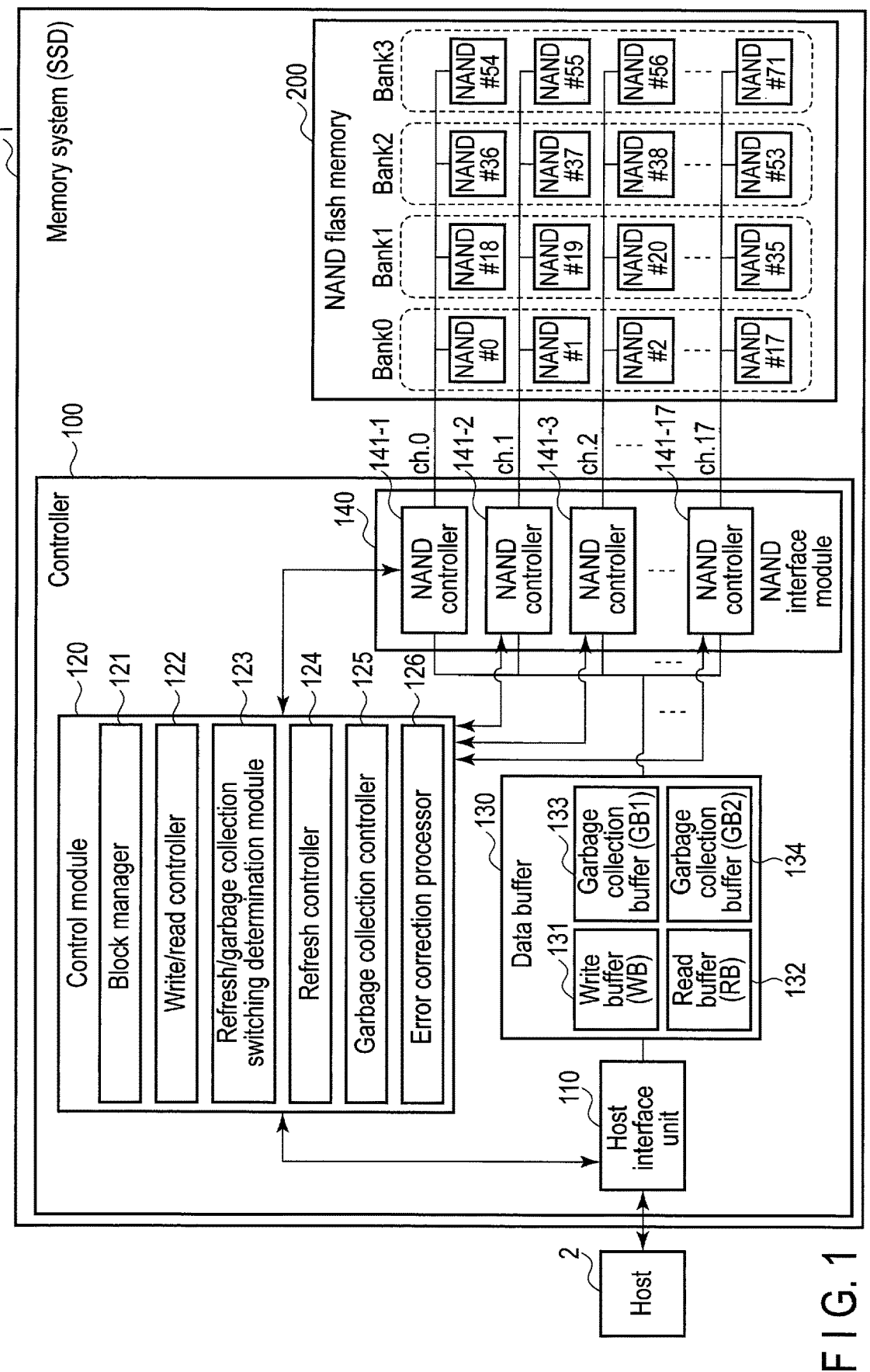
F I G. 1

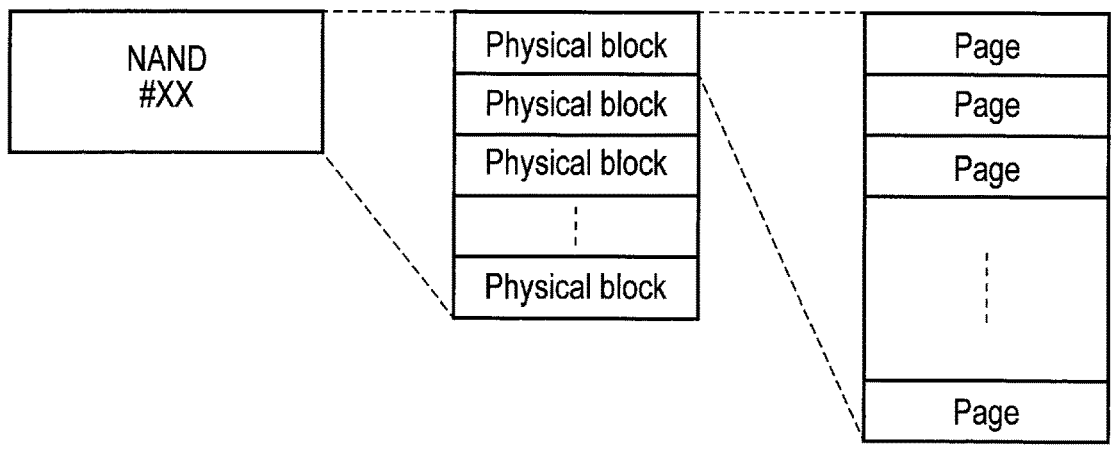
F I G. 2
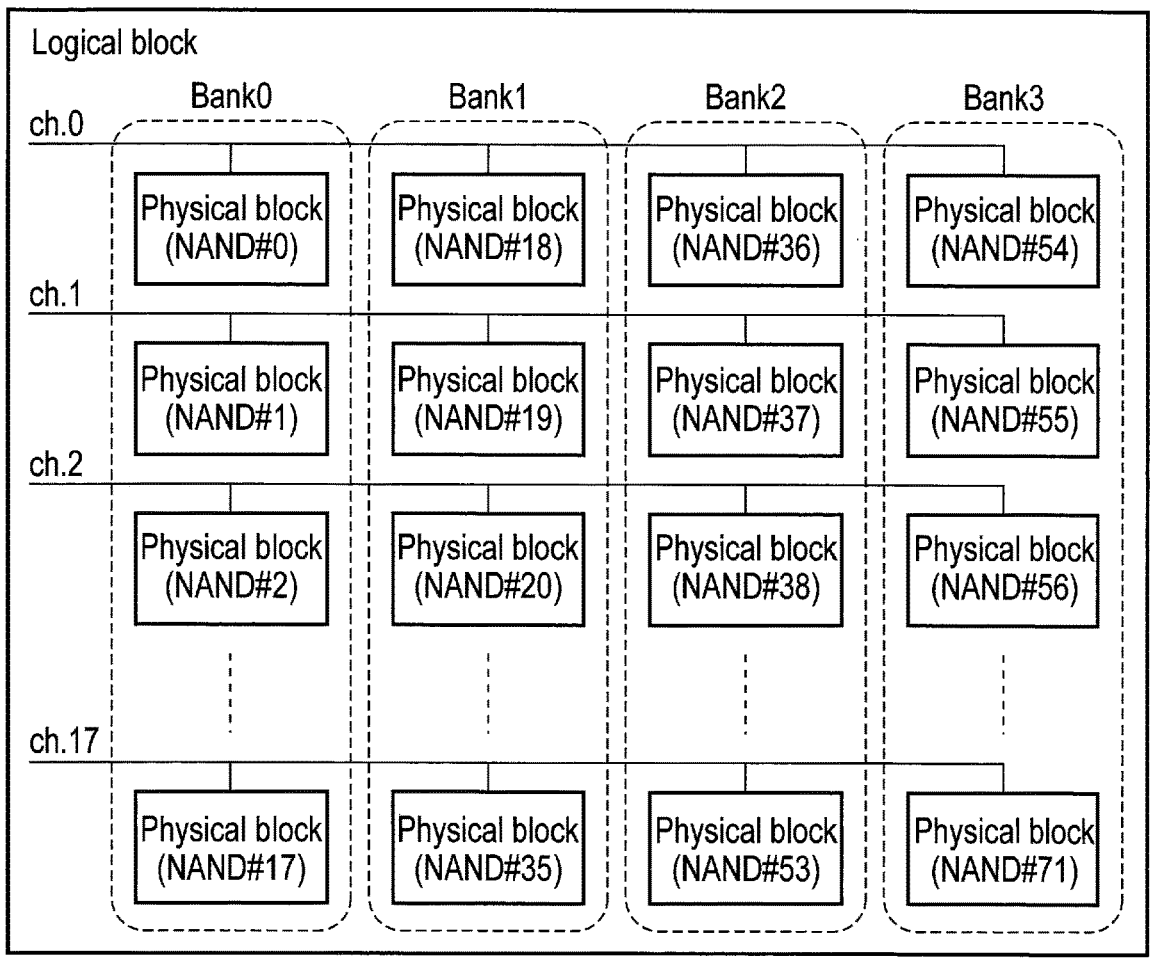
F I G. 3

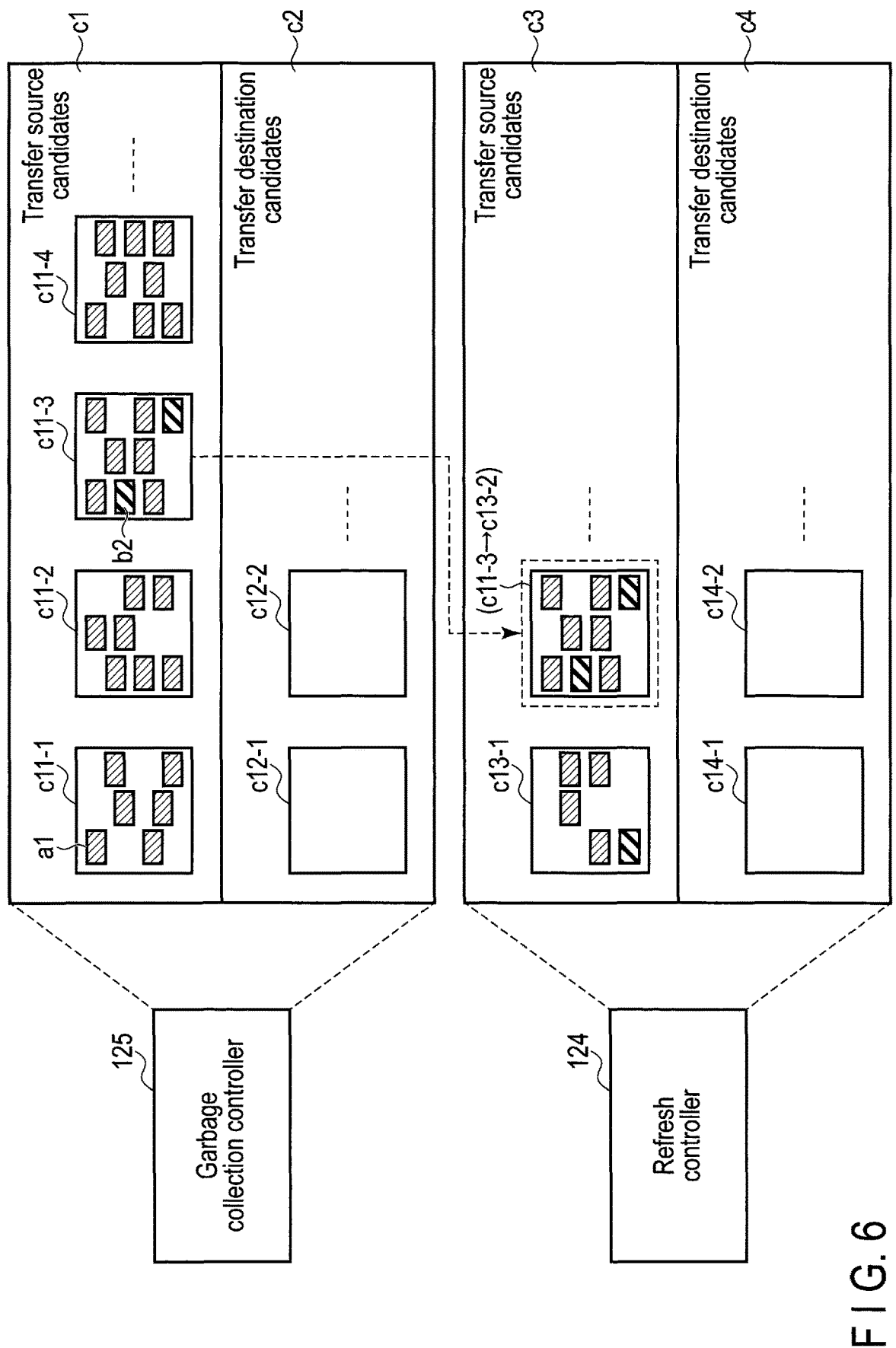
F I G. 6

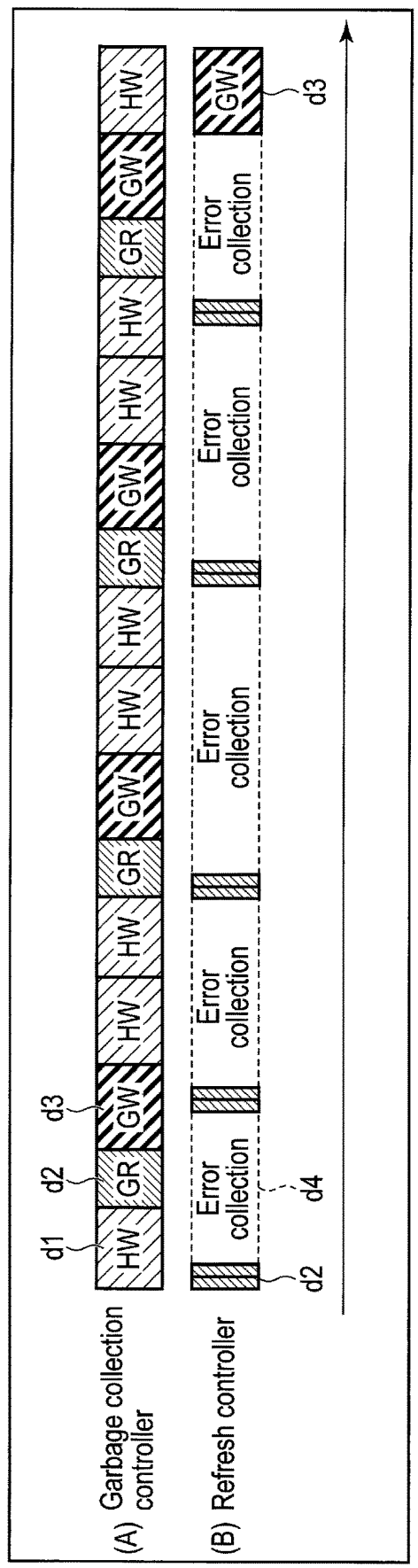
F I G. 7

MEMORY SYSTEM AND GARBAGE COLLECTION CONTROL METHOD

CROSS-REFERENCE TO RELATED APPLICATIONS

This application is based upon and claims the benefit of priority from Japanese Patent Application No. 2019-163806, filed Sep. 9, 2019, the entire contents of which are incorporated herein by reference.

FIELD

Embodiments described herein relate generally to a memory system and a garbage collection control method.

BACKGROUND

In a memory system such as a solid state drive (SSD) including a NAND flash memory (NAND memory), it is necessary to execute a process called garbage collection for reusing a storage area in which unnecessary (invalid) data remains. The garbage collection is referred to also as compaction.

In addition, in this type of memory system, it is also necessary to execute a process of storing valid data again on the NAND memory, which is called refresh. More specifically, the refresh includes a process of transferring valid data within the NAND memory.

As is a case of the refresh, the garbage collection includes a process of transferring valid data on the NAND memory within the NAND memory. Therefore, it is considered that data to be transferred for the refresh can be mixed as part of data to be transferred for the garbage collection, and data transfer for the refresh can be executed in the garbage collection. That is, it is considered that the refresh can be incorporated into the garbage collection.

However, in a case of executing the garbage collection also for the purpose of the refresh, depending on a situation of data which need the refresh, a ratio of an operation of writing data for the garbage collection to an operation of writing data in response to a request from a host device increases, and a performance of a memory system may be degraded in the short term.

BRIEF DESCRIPTION OF THE DRAWINGS

FIG. 1 is a diagram showing a configuration example of a memory system of an embodiment.

FIG. 2 is a diagram showing a configuration example of NAND flash memory dies included in a NAND flash memory provided in the memory system of the embodiment.

FIG. 3 is a diagram showing a configuration example of a logical block managed with regard to the NAND flash memory in the memory system of the embodiment.

FIG. 6 is a diagram for explaining an overview of a process of switching a block in the memory system of the embodiment.

FIG. 7 is a diagram for explaining an advantageous effect of the process of switching the block in the memory system of the embodiment.

DETAILED DESCRIPTION

Figure 4:
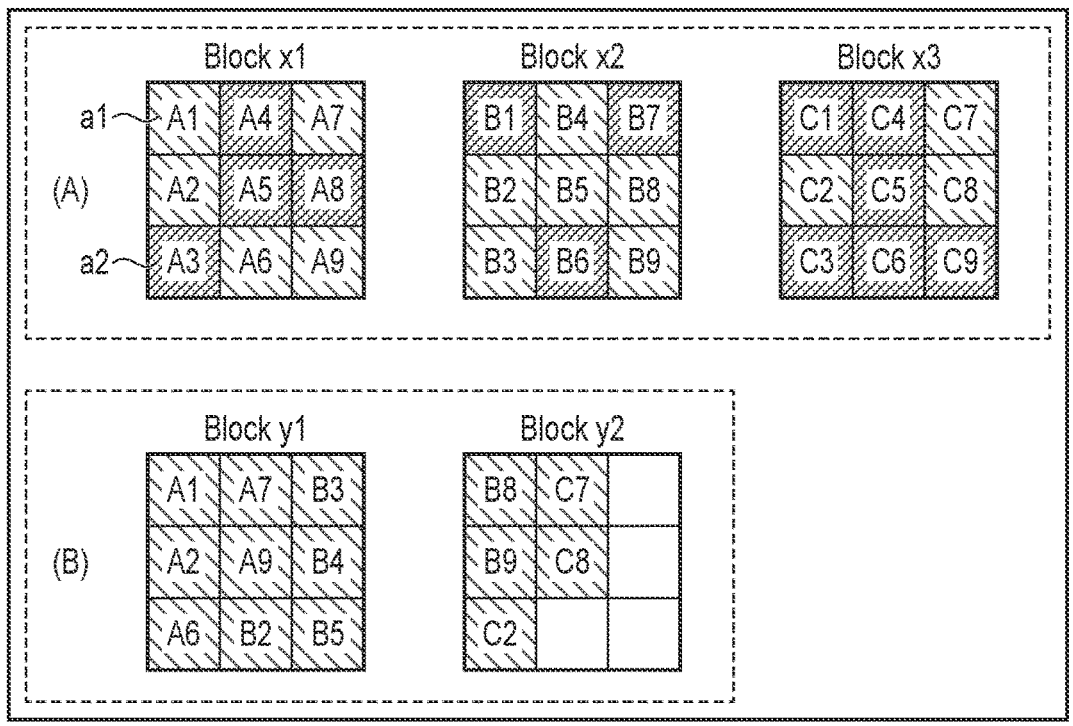
FIG. 4 is a diagram for explaining an overview of garbage collection executed for free block allocation in the memory system of the embodiment.

Various embodiments will be described hereinafter with reference to the accompanying drawings.

In general, according to one embodiment, a memory system includes a nonvolatile memory and a controller. The nonvolatile memory includes a plurality of blocks. The controller is configured to control an operation of writing data to the nonvolatile memory and an operation of reading data to the nonvolatile memory. The controller includes a first processor and a second processor. The first processor is configured to execute a first process of creating one or more free blocks by transferring valid data in N blocks (where N is a natural number greater than or equal to two) to blocks of number less than N. The second processor is configured to execute a second process of transferring valid data including data which needs refresh in M blocks (where M is a natural number greater than or equal to one) to blocks of number less than or equal to M.

FIG. 1 is a diagram showing a configuration example of a memory system 1 of the present embodiment. Here, it is assumed that the memory system 1 is implemented as an SSD.

The memory system 1 which is an SSD includes a controller 100 configured as a semiconductor integrated circuit such as a system-on-a-chip (SoC), and a NAND flash memory (NAND memory) 200.

The controller 100 includes a host interface module 110, a control module 120, a data buffer 130 such as an SRAM, and a NAND interface module 140. The data buffer 130 may be provided as, for example, a DRAM on the outside of the controller 100 instead.

The host interface module 110 is a device including a circuit which connects the memory system 1 and a host 2, and executes communication conforming to PCIe (registered trademark), for example. The host interface module 110 receives a command from the host 2.

The control module 120 receives a command from the host 2 which is connected via the host interface module 110, executes a process corresponding to the command, and transmits the result of the process to the host 2. The command that is received from the host 2 includes a write command which requests to write data, a read command which requests to read data, and the like. More specifically, the control module 120 writes data to the NAND memory 200 and reads data from the NAND memory 200 while using the data buffer 130 as a temporary data storage area.

The control module 120 includes a processor such as a CPU, and by executing firmware (programs) stored in the NAND memory 200, for example, the control module 120 realizes various processing modules such as a block manager 121, a write and read controller 122, a refresh and garbage collection switching determination module 123, a refresh controller 124, a garbage collection controller 125, and an error correction processor 126. Instead of realizing the processing modules software-wise by executing the programs by the CPU, it is possible to realize part or all of the processing modules hardware-wise by, for example, electronic circuits, etc.

In a case where the processing modules are realized software-wise, the control module 120 may execute the processes of the processing modules in parallel with one another in a plurality of CPUs, or may execute the processes of the processing modules in a time-sharing manner in one CPU. Alternatively, the processes of the processing modules may be executed in a time-sharing manner and in parallel with one another in a plurality of CPUs. That is, for example, the refresh controller 124 and the garbage collection controller 125 may be operated in parallel with each other in the memory system 1.

The block manager 121 forms an extended logical block including some of physical blocks included in the NAND memory 200. In addition, the block manager 121 manages information about a logical block (block information) and supplies logical blocks to the write and read controller 122, the refresh controller 124, the garbage collection controller 125, and the like.

Here, the logical block managed by the block manager 121 will be described with reference to FIG. 2 and FIG. 3 in addition to FIG. 1.

As shown in FIG. 1, the NAND memory 200 includes a plurality of NAND flash memory dies (NAND memory dies) NAND #xx. Each NAND memory die includes a memory cell array which includes a plurality of physical blocks and stores data in a nonvolatile manner, and a peripheral circuit which controls the memory cell array. The NAND memory dies can operate independently of one another. That is, a NAND memory die functions as a parallel operation unit. The NAND memory dies are referred to also as NAND flash memory chips or nonvolatile memory chips. The same number of NAND memory dies (for example, 4 NAND memory dies) may be connected to each of a plurality of channels (for example, 18 channels Ch.0 to Ch.17). The channels Ch.0 to Ch.17 include communication lines (memory buses) through which a plurality of NAND controllers 141_1 to 141_17 of the NAND interface module 140 communicate with the NAND memory dies, respectively.

For example, 18 NAND memory dies connected in parallel with one another to each of the channels Ch.0 to Ch.17, that is, NAND memory dies #0 to #17, NAND memory dies #18 to #35, NAND memory dies #36 to #53, and NAND memory dies #54 to #71 may be organized as banks (banks 0 to 3), respectively. A bank functions as a unit in which a plurality of NAND memory dies are operated in parallel with one another by bank interleaving. In the configuration example shown in FIG. 1, a maximum of 72 NAND memory dies can be operated in parallel with one another by 18 channels and bank interleaving using 4 banks.

FIG. 2 is a diagram showing a configuration example of the NAND memory die.

As shown in FIG. 2, the NAND memory die includes a plurality of physical blocks each including a plurality of pages. Data are written and read in page units. On the other hand, data are erased in physical block units. Data are not overwritten to a page to which data has already been written. Therefore, data are updated by invalidating original data on a certain page and writing new data to another page. This may cause a situation where a certain physical block is mostly occupied with unnecessary data (invalid data). A proportion of valid data to a valid area in which data can be stored except a defective page of a physical block is called a valid cluster ratio, etc. In addition, generally, a process subjected to a physical block having a low valid cluster ratio for the purpose of reusing an area in which unnecessary data remains is called garbage collection or compaction. The garbage collection will be described later in detail.

FIG. 3 is a diagram showing a configuration example of the logical block managed by the block manager 121.

The block manager 121 manages a plurality of logical blocks each including a plurality of physical blocks. In addition, it is assumed that at least erasing of data is executed in logical block units in the memory system 1.

For example, the block manager 121 selects one physical block from each of the NAND memory dies #0 to #71 and manages a logical block including a total of 72 physical blocks. Since the NAND memory dies #0 to #71 can be operated in parallel with one another by 18 channels and bank interleaving using 4 banks, for example, the operation of writing data to one logical block can be executed in 72 page units. Note that the block manager 121 may manage a logical block by selecting one physical block from each of NAND flash memory dies (for example, 36 or 18 NAND flash memory dies) which are less than 72 NAND memory dies. A combination of NAND memory dies with regard to one logical block should preferably be a combination of NAND memory dies whose channels or banks are different from one another. In a case where each NAND memory die forms multiple planes (for example, two planes), for example, the block manager 121 may select one physical block from each of 144 planes corresponding to the NAND memory dies #0 to #71 and may manage a logical block including a total of 144 physical blocks. Note that a block in the following description means a logical block managed by the block manager 121.

Now, the explanations of the processing modules in the control module 120 will be continued with reference to FIG. 1.

The write and read controller 122 executes an operation of writing of data to the NAND memory 200 or an operation of reading of data from the NAND memory 200 requested from the host 2. More specifically, in an operation of writing data, the write and read controller 122 instructs any of the NAND controllers 141_1 to 141_17 of the NAND interface module 140 to execute an operation of writing write data, which is received via the host interface module 110 and is stored in the write buffer 131 in the data buffer 130, to the NAND memory 200. In an operation of reading data, the write and read controller 122 instructs any of the NAND controllers 141_1 to 141_17 of the NAND interface module 140 to execute an operation of reading read data from the NAND memory 200. The read data are temporarily stored in the read buffer 132 in the data buffer 130 and is transmitted to the host 2 via the host interface module 110.

In addition, by receiving a block from the block manager 121, the write and read controller 122 executes an operation of writing data to the NAND memory 200. The block manager 121 manages a used/unused state of each block, the total number of blocks, the number of blocks in an unused state, and the like, as block information. Note that a block in an unused state does not mean that the block has never been used but means that data are erased from the block and the block can be used again. Certainly, a block in an unused state also includes a block which has never been used. A block in an unused state will be hereinafter referred to as a free block.

With regard to the garbage collection which the refresh controller 124 executes or the garbage collection which the garbage collection controller 125 executes, the refresh and garbage collection switching determination module 123 executes a process of switching a block including valid data and applied as a transfer source from one process (garbage collection) to another process under a certain condition. The refresh and garbage collection switching determination module 123 will be described later in detail.

The refresh controller 124 executes the garbage collection for refresh, for example, for preservation of data called cold data which is not used (not accessed) for a long time or for recovery of data from an error which occurs due to the characteristics of the NAND memory 200. On the other hand, the garbage collection controller 125 executes the garbage collection for free block allocation. That is, the memory system 1 according to the present embodiment has a mechanism which can execute two systems of the garbage collection for different purposes. In other words, in order to execute the garbage collection for the refresh and the garbage collection for free block allocation independently of each other, the memory system 1 according to the present embodiment includes the refresh controller 124 and the garbage collection controller 125. Note that, in contrast to cold data, data which is used (accessed) within a certain time is called hot data, for example.

Here, overviews of two systems of the garbage collection which are executed respectively in the memory system 1 according to the present embodiment will be described with reference to FIG. 4 and FIG. 5.

FIG. 4 is a diagram for explaining an overview of the garbage collection for free block allocation executed by the garbage collection controller 125.

In FIG. 4, one block consists of nine pages. Three blocks, that is, a block x1, a block x2 and a block x3 in FIG. 4 (A) are blocks which the garbage collection controller 125 has selected as transfer sources of valid data. On the other hand, two blocks, that is, a block y1 and a block y2 in FIG. 4 (B) are blocks which the garbage collection controller 125 has received as transfer destinations of valid data from the block management 121. In each block of FIG. 4 (A), a page having a hatch pattern indicated by a reference number a1 is a page on which valid data are stored, and a page having a hatch pattern indicated by a reference number a2 is a page on which unnecessary data remains.

The garbage collection controller 125 selects one block as a candidate for a transfer source of valid data, and notifies the block manager 121 of the block. When notified by the block manager 121, the refresh controller 124, which executes the garbage collection for the refresh, selects one block as a candidate for a transfer source of valid data. The block manager 121 manages the block selected as a candidate for a transfer source of valid data by the garbage collection controller 125 and the block selected as a candidate for a transfer source of valid data by the refresh controller 124. The block manager 121 supplies the blocks selected as transfer sources of valid data to the garbage collection controller 125 and the refresh controller 124. The garbage collection controller 125 obtains a state of the block selected as a candidate for a transfer source from the block manager 121. If the block has already been selected as a candidate by the refresh controller 124, the garbage collection controller 125 deselects the block as a candidate and selects another block as a candidate for a transfer source of valid data again. Consequently, it is possible to prevent the same block from being selected as a transfer source of valid data by both the garbage collection controller 125 and the refresh controller 124.

Note that the block manager 121 manages the valid cluster ratio of each block as block information. Therefore, the garbage collection controller 125 cooperates with the block manager 121 and selects a block as a candidate for a transfer source of valid data in increasing order of valid cluster ratio, that is, a block having the lowest valid cluster ratio first.

In addition, since the garbage collection controller 125 and the refresh controller 124 receive blocks as transfer destinations of valid data from the block manager 121, it is also possible to prevent the same block from being applied as a transfer destination of valid data by both the garbage collection controller 125 and the refresh controller 124.

That is, in the memory system 1 according to the present embodiment, in order to prevent the same block from being applied in an overlapping manner to both the garbage collection controller 125 and the refresh controller 124 as a transfer source block of valid data or a transfer destination block of valid data, a candidate for a transfer source block of valid data and a candidate for a transfer destination block of valid data are managed in the garbage collection controller 125 and the refresh controller 124 independently of each other.

In the example shown in FIG. 4, there are five pages (A1, A2, A6, A7 and A9) in the block x1, six pages (B2, B3, B4, B5, B8 and B9) in the block x2, and three pages (C2, C7 and C8) in the block x3, respectively, as a page in which valid data are stored. That is, there are a total of 14 pages in three blocks. In other words, 13 pages are wasted in three blocks. The number of wasted pages exceeds the number of pages in a block.

The garbage collection controller 125 only writes valid data in a block which the garbage collection controller 125 has selected as a transfer source of valid data to a block which the garbage collection controller 125 has received as a transfer destination of valid data from the block manager 121. The write operation for this data transfer is executed on a total of 14 pages, that is, in two blocks. Therefore, after deduction from original three blocks, one free block is created.

Figure 5:
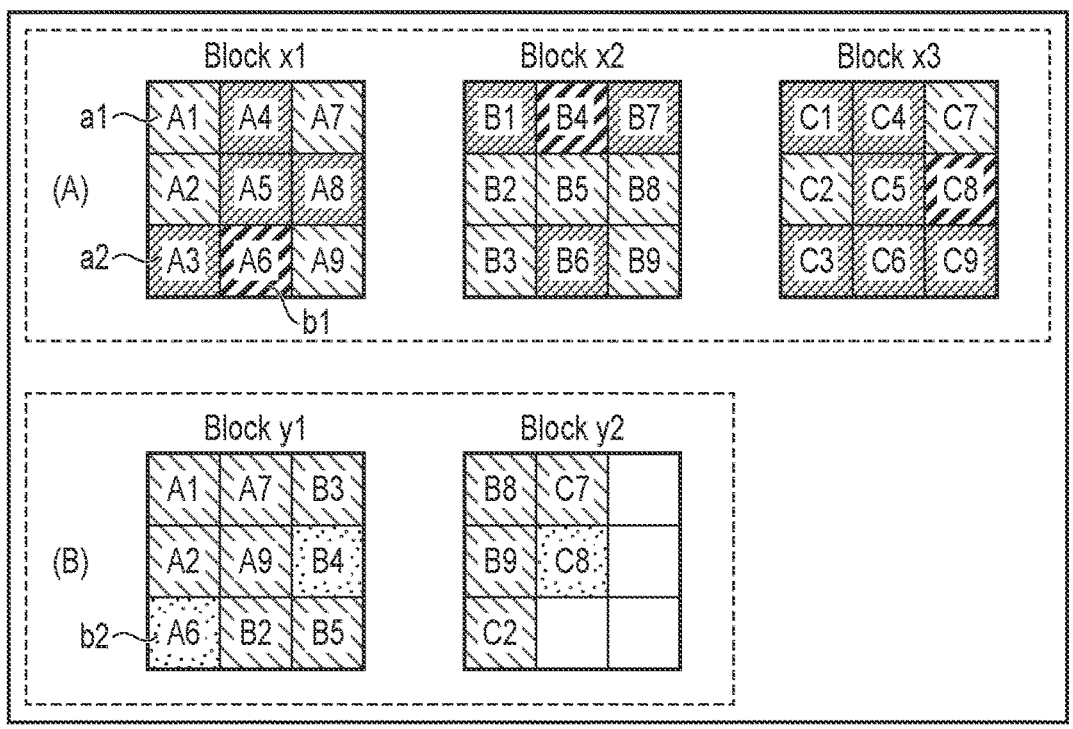
FIG. 5 is a diagram for explaining an overview of garbage collection executed for refresh in the memory system of the embodiment.

On the other hand, FIG. 5 is a diagram for explaining an overview of the garbage collection for the refresh executed by the refresh controller 124.

Also in FIG. 5, one block consists of nine pages. Three blocks, that is, a block x1, a block x2 and a block x3 in FIG. 5 (A) are blocks which the refresh controller 124 has selected as transfer sources of valid data. On the other hand, two blocks, that is, a block y1 and a block y2 in FIG. 5 (B) are blocks which the refresh controller 124 has received as transfer destinations of valid data from the block manager 121. In each block of FIG. 5 (B), a page having the hatch pattern indicated by the reference number a1 shown in FIG. 5(A) is a page on which valid data which does not need the refresh is stored, and a page having the hatch pattern indicated by the reference number a2 shown in FIG. 5(A) is a page on which unnecessary data remains. In each block of FIG. 5 (B), a page having a hatch pattern indicated by a reference number b1 is a page on which valid data which needs the refresh is stored (A6, B4 and C8).

Data which needs the refresh, that is, data which needs to be relocated within the NAND memory 200 is data called cold data which is not used (data which is not read) for a long Lime, and for example, data which needs to be recovered from an error which has occurred hardware-wise due to the characteristics of the NAND memory 200. It is possible to achieve the refresh by transferring such data completely from a block including such data to another block. However, in the memory system 1, the refresh controller 124 selects a block including such data as a transfer source of valid data and executes the garbage collection also for the purpose of the refresh, that is, the garbage collection for the refresh.

A block including data which needs the refresh is managed by the block manager 121 based on block information. The refresh controller 124 cooperates with the block manager 121 and obtains a block including data which needs the refresh, that is, a block as a transfer source of valid data.

Consequently, as is the case with the garbage collection for allocation of a plurality of free blocks by the garbage collection controller 125, valid data including data which needs the refresh within three source blocks are relocated to two transfer destination blocks, and one free block is created. In each block of FIG. 5 (B), a page having a hatch pattern indicated by a reference number b2 is a page on which valid data subjected to the refresh by relocation is stored (A6, B4 and C8).

Although FIG. 5 shows an example where one free block is created, in the garbage collection for the refresh, a transfer source block is not necessarily a block having a low valid cluster ratio, and therefore a free block may not be created in some cases. That is, a free block may be created as a result of the garbage collection for the refresh, but the garbage collection for the refresh is not intended to create a free block.

For example, if an error (data error) occurs in data when the data are read from the NAND memory 200, the refresh controller 124 requests the error correction processor 126 to correct the error (data error). The error correction processor 126 executes error correction using an error correcting code (ECC), for example. In the error correction, due to a trade-off between correction time and correction capability, the error correction processor 126 executes error correction using ECC at three levels in the order of L1 correction, L2 correction and L3 correction according to correction time and correction capability. For example, the error correction processor 126 firstly executes the L1 correction whose correction time is short but correction capability is low, and if error correction fails, the error correction processor 126 secondly executes the L2 correction whose correction time is longer but correction capability is higher as compared to the L1 correction. If error correction fails, the error correction processor 126 executes the L3 correction whose correction time is long but correction capability is high as compared to the L2 correction.

Also in the garbage collection by the garbage collection controller 125, an error may occur when data are read from a transfer source block. The garbage collection controller 125 requests the error correction processor 126 to correct the error.

The refresh controller 124 and the garbage collection controller 125 execute the garbage collection using the data buffer 130 as a work area. A garbage collection buffer 133 and a garbage collection buffer 134 within the data buffer 130 shown in FIG. 1 are areas which are allocated to the refresh controller 124 and the garbage collection controller 125, respectively.

The NAND interface module 140 is a devise which communicates with the NAND memory 200, and includes the NAND controllers 141_0 to 141_17 provided in one-to-one correspondence with the aforementioned channels Ch.0 to Ch.17. The control module 120, more specifically, the write and read controller 122, the refresh controller 124 and the garbage collection controller 125 control the NAND controllers 141_0 to 141_17 of the NAND interface module 140, and write data to the NAND memory 200 and read data from the NAND memory 200.

Next, the execution cycle of the garbage collection for free block allocation by the garbage collection controller 125 and the execution cycle of the garbage collection for the refresh by the refresh controller 124 in the memory system 1 will be described.

As described above, the block manager 121 manages at least the total number of blocks and the number of free blocks as block information. The garbage collection controller 125 controls the execution cycle of the garbage collection for free block allocation based on, for example, the number of free blocks in the total number of blocks or the proportion of the number of free blocks to the total number of blocks. More specifically, the garbage collection controller 125 adjusts the execution cycle such that the garbage collection controller 125 executes the garbage collection in a shorter cycle as the number of free blocks becomes smaller.

The garbage collection controller 125 adjusts the execution cycle based on the ratio between an operation of writing data in response to a request from the host (hereinafter referred to as a host write operation) and an operation of writing data for the garbage collection (hereinafter referred to as a GC write operation) which are executed by the write and read controller 122. More specifically, the garbage collection controller 125 adjusts the execution cycle of the garbage collection such that the host write operation does not stagnate exceeding an acceptable range due to the GC write operation.

The ratio between a host write operation and a GC write operation is called a gear ratio, for example. Here, an increase of the ratio of the GC write operation to the host write operation is referred to as to an increase of the gear ratio. When the number of host write operations per unit period is referred to as A and the number of GC write operations is referred to as B, the gear ratio can be expressed as A:B. The garbage collection controller 125 adjusts the execution period of the garbage collection by adjusting the gear ratio such that the value of B increases as the number of free blocks increases.

At the gear ratio of A:B, when the number of transfer destination blocks consumed by the host write operations is A, the number of transfer destination blocks consumed by the GC write operations is B. Consequently, the garbage collection controller 125 executes the garbage collection such that the number of free blocks to be created will be A+B or a multiple number of A+B.

In addition, if there are a sufficient number of free blocks and it is unnecessary to create a further free block or if there is no block having a low valid cluster ratio and a free block is less likely to be created efficiently, the garbage collection controller 125 may stop the garbage collection.

Note that, in the case of executing the garbage collection in one system, for example, in the case of executing the garbage collection also for the purpose of the refresh, the execution cycle is adjusted based on the gear ratio of A:(B+C), where C is the number of data write operations for the purpose of the refresh.

On the other hand, the refresh controller 124 controls the execution cycle of the garbage collection based on, for example, the number of blocks including data which needs the refresh or the severity of an error which causes a block to be subjected to the refresh. More specifically, the refresh controller 124 adjusts the execution cycle such that the refresh controller 124 executes the garbage collection in a shorter cycle as the number of blocks to be subjected to the refresh becomes larger or the error severity becomes higher. The error severity is determined according to the type of error, for example. With regard to the block to be subjected to the refresh, the error severity is management by the refresh controller 124.

Unlike the garbage collection controller 125 which adjusts the execution cycle of the garbage collection based on the gear ratio, the refresh controller 124 adjusts the execution cycle of the garbage collection regardless of the host write operation. In the garbage collection by the garbage collection controller 125, the execution cycle is adjusted based on the gear ratio, and therefore if a write request is not issued from the host 2, the write operation of the garbage collection does not proceed in some cases. However, in the refresh, for example, if an error which disables the NAND memory in NAND memory die (nonvolatile memory chip) units (hereinafter referred to as a chip unit error) occurs, it is possible to complete recovery of data recorded on the NAND memory die within a predetermined time independently of the host write operation.

When receiving a notification from the block management 121, the refresh controller 124 obtains a block including data which needs the refresh. That is, the refresh controller 124 executes the garbage collection also for the purpose of the refresh, that is, the garbage collection for the refresh in response to the notification from the block manager 121.

As described above, the memory system 1 according to the present embodiment includes the refresh controller 124 and the garbage collection controller 125, and executes the garbage collection for the refresh and the garbage collection for free block allocation independently of each other.

In the case of executing the garbage collection in one system, that is, in the case of executing the garbage collection also for the purpose of the refresh, for example, when a large number of blocks each including a mixture of hot data and cold data are created, valid cluster ratios will not become low on average. As a result, the efficiency of free block creation is reduced, and the write performance in response to the request from the host 2 is degraded. More specifically, in such a situation, a block including cold data and having a not-so-low valid cluster ratio is frequency selected as a block to be subjected to the garbage collection, and the efficiency of free block creation is reduced and the write performance in response to the request from the host 2 is degraded, accordingly.

In contrast, in the memory system 1 according to the present embodiment, the garbage collection for the refresh and the garbage collection for free block allocation are independently executed in two systems, and therefore, even in the aforementioned situation, it is possible to collect cold data from a plurality of blocks into one block without reducing the efficiency of free block creation.

In addition, in the case of executing the garbage collection in one system, the data write operation for the refresh is also adjusted based on the gear ratio. Therefore, for example, when a chip unit error occurs, the recovery of data recorded on the NAND memory die may not be completed within a requested predetermined time.

On the other hand, in the memory system 1 according to the present embodiment, the execution cycle of the garbage collection for the refresh is adjusted based on the number of blocks including data which needs the refresh or the severity of an error which causes a block to be subjected to the refresh and occurs due to the NAND memory 200, regardless of the host write operation. Therefore, when the aforementioned chip unit error occurs, the recovery of data recorded on the NAND memory die can be completed within a predetermined time independently of the host write operation.

In addition, the memory system 1 according to the present embodiment executes the garbage collection for the refresh and the garbage collection for free block allocation independently in two systems. Therefore, for example, in a situation where it is unnecessary to create a free block, the garbage collection for free block allocation can be stopped and the host write operation can be independently executed.

In the case of executing the garbage collection in one system, even when the garbage collection is stopped in the aforementioned situation, if a block which needs the refresh is generated, the block and a block having a low valid cluster ratio may be selected, and the garbage collection may be executed for the purpose of creating a free block.

On the other hand, in the memory system 1 according to the present embodiment, while the garbage collection for free block allocation is being stopped, the garbage collection for the refresh is prevented from creating a free block more than necessary, and valid data in a block which needs the refresh can be transferred to a free block.

Although the number of the refresh controller 124 and the garbage collection controller 125 is assumed to be one in FIG. 1, the number of one or both of these modules may be two or more.

Next, the refresh and garbage collection switching determination module 123 will be described. FIG. 6 is a diagram showing an example where the refresh and garbage collection switching determination module 123 switches a block which is selected as a candidate for a transfer source of valid data in the garbage collection for free block allocation, which the garbage collection controller 125 executes, to a candidate for a transfer source in the garbage collection for the refresh, which the refresh controller 124 executes.

The garbage collection controller 125 cooperates with the block manager 121, and selects and manages blocks (c11_1, c11_2, c11_3, c11_4, . . . , etc.) as transfer source candidates (c1) and selects and manages blocks (c12_1, c12_2, . . . , etc.) as transfer destination candidates (c2) such that the same block will not be applied in an overlapping manner to both the garbage collection controller 125 and the refresh controller 124.

Similarly, the refresh controller 124 cooperates with the block manager 121, and selects and manages blocks (c13_1, . . . , etc.) as transfer source candidates (c3) and selects and manages blocks (c14_1, c14_2, . . . , etc.) as transfer destination candidates (c4) such that the same block will not be applied in an overlapping manner to both the refresh controller 124 and the garbage collection controller 125.

As described above, also in the garbage collection by the garbage collection controller 125, in some cases, an error occurs when data are read from a transfer source block. The garbage collection controller 125 requests the error correction processor 126 to correct the error. In addition, as described above, the error correction processor 126 executes error correction using ECC at three levels in the order of the L1 correction, the L2 correction and the L3 correction, that is, in the increasing order of correction time, collection having the shortest correction time first.

Here, it is assumed that, when valid data in the block c11_3 is read by the garbage collection controller 125, an error occurs in data on a plurality of pages (at least one page). A page having a hatch pattern indicated by a reference number b2 in the block c11_3 is a page on which an error occurs when data are read. It is also assumed that these errors need the L2 correction or the L3 correction which takes relatively long correction time. In this case, the write operation of the garbage collection for free block allocation executed by the garbage collection controller 125 takes a long time, and as a result, the host write operation may stagnate.

Therefore, in the memory system 1 according to the present embodiment, under the control of the refresh and garbage collection switching determination module 123, the block (c11_3) is switched from a transfer source candidate (c1) of the garbage collection controller 125 to a transfer source candidate (c3) of the refresh controller 124 (from c11_3 to c13_2).

For example, in a case where error correction fails in the L1 correction and the L2 correction and proceeds to the L3 correction or in a case where the L3 correction successively occurs in the same block, the error correction processor 126 notifies the refresh and garbage collection switching determination module 123 of this. When receiving this notification, the refresh and garbage switching determination module 123 manages the block. The condition for the notification from the error correction processor 126 to the refresh and garbage collection switching determination module 123 includes a case where error correction fails in the L1 correction and the L2 correction and proceeds to the L3 correction, a case where the L3 correction successively occurs in the same block, and various other cases.

The refresh and garbage collection switching determination module 123 which has received this notification determines whether the block is used by the garbage collection controller 125 or not, and instructs the garbage collection controller 125 to stop the garbage collection. When receiving this instruction, the garbage collection controller 125 stops the garbage collection and deselects the block which is being processed as a transfer source candidate. In addition, the refresh and garbage collection switching determination module 123 instructs the refresh controller 124 to select the block notified from the error correction processor 126 as a transfer source candidate. That is, the refresh and garbage collection switching determination module 123 executes a process of switching the block from the garbage collection controller 125 to the refresh controller 124. In addition, the refresh and garbage collection switching determination module 123 controls the garbage collection controller 125 such that the garbage collection controller 125 does not request the error correction processor 126 to execute error correction. According to this control, in a situation where the garbage collection controller 125 has already requested the NAND memory 200 via the NAND interface module 140 to read data from a block, it is possible to handle occurrence of a further error in data in the block.

After the garbage collection controller 125 stops the garbage collection and the process of switching the block to the refresh controller 124 is completed, the refresh and garbage collection switching determination module 123 instructs the garbage collection controller 125 to resume the garbage collection and ends the control of the garbage collection controller 125 which prevents the garbage collection controller 125 from requesting the error correction processor 126 to execute error correction. The garbage collection controller 125 selects a block as a transfer source candidate again in place of the block deselected as a transfer source candidate, and resumes the garbage collection.

With reference to FIG. 7, the advantageous effect of the process of switching the block from the garbage collection controller 125 to the refresh controller 124 by the refresh and garbage collection switching determination module 123 will be described.

FIG. 7 (A) shows the process flow of the garbage collection controller 125. A section (HW) having a hatch pattern indicated by a reference number d1 indicates execution of a host write operation, a section (GR) having a hatch pattern indicated by a reference number d2 indicates execution of a data read operation for the garbage collection, and a section (GW) having a hatch pattern indicated by a reference number d3 indicates execution of a GC write operation.

On the other hand, FIG. 7 (B) shows the process flow of the refresh controller 124. A section indicated by the reference number d2 is the same as FIG. 7 (A), and a section indicated by a reference number d4 indicates recovery of data in which an error has occurred, that is, execution of error correction. During the period of error correction which accounts for most of the garbage collection of the refresh controller 124, since the NAND interface module 140 is not involved, the host write operation or the data read operation or data write operation for the garbage collection will not be interfered.

However, in the case of executing the garbage collection in one system, if an error occurs at the time of reading data from a transfer source block and correction of the error takes a long time, a host write operation will stagnate until a data write operation of a transfer destination block including the correction of the error is completed. On the other hand, the memory system 1 according to the present embodiment has the function of switching the block including data which takes long correction time from the garbage collection controller 125 to the refresh controller 124. Therefore, stagnation of the host write operation can be prevented, and the garbage collection for free block allocation can be completed within a predetermined time.

In addition, the refresh and garbage collection switching determination module 123 has the function of preventing the process of switching the block from the garbage collection controller 125 to the refresh controller 124 under certain conditions. More specifically, the process of switching the block from the garbage collection controller 125 to the refresh controller 124 is prevented, for example, in a case where a chip unit error occurs or in a case where the number of free blocks is less than a certain number.

According to this function, in the former case, it is possible to prevent the recovery of data on the disabled NAND memory die (nonvolatile memory chip) from being delayed by another error which has separately occurred. In addition, in the latter case, it is possible to give priority to the free block creation over the host write operation, immediately create a free block, and maintain the write performance in the short term.

Furthermore, in a situation where it is necessary to prevent the process of switching the block from the garbage collection controller 125 to the refresh controller 124, the refresh and garbage collection switching determination module 123 instructs the error correction processor 126 to continue error correction without interrupting error correction even if, for example, the L3 correction successively occurs in the same block or on the same page.

Figure 8:
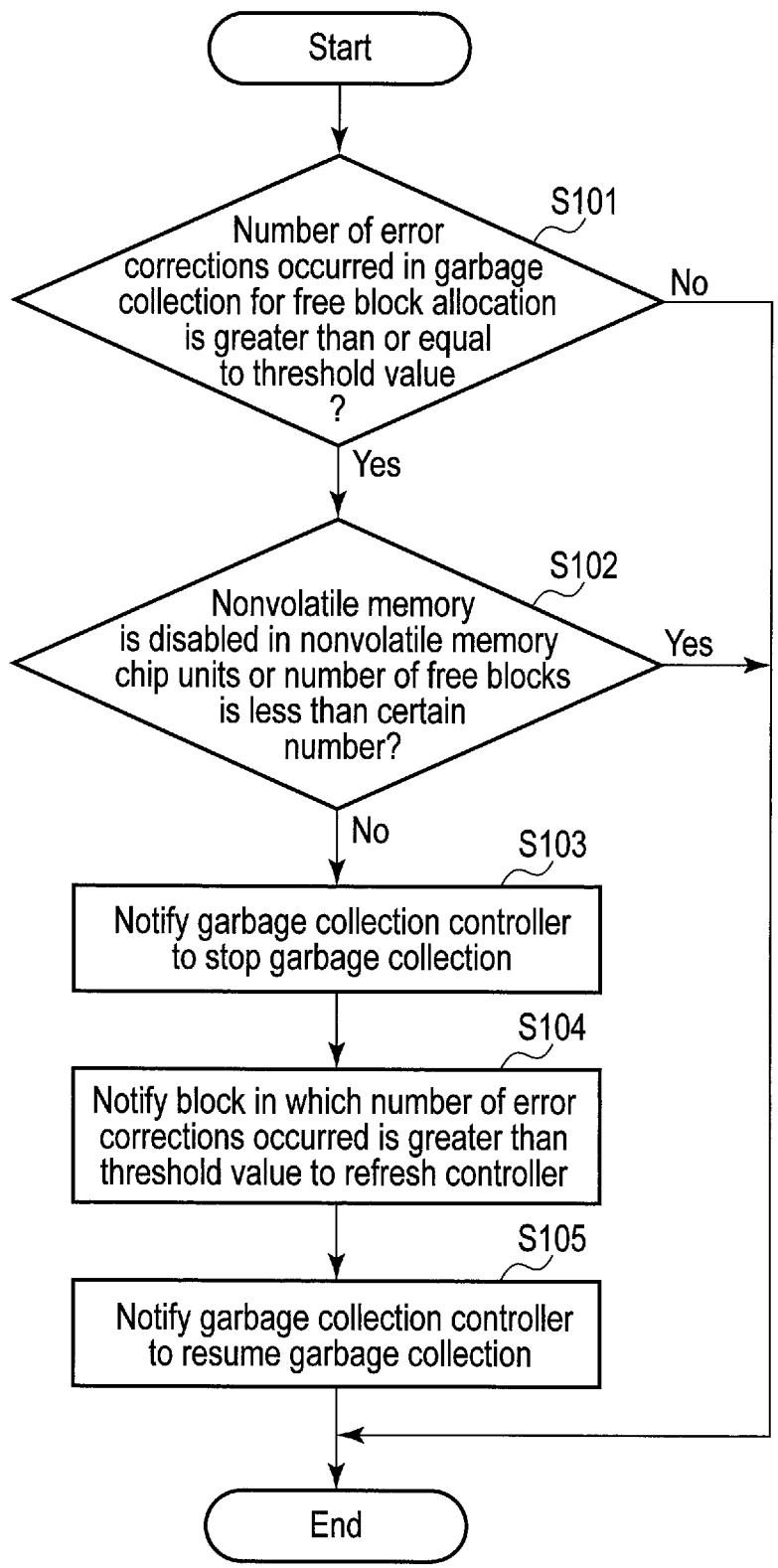
FIG. 8 is a flowchart showing a process flow in the memory system of the embodiment.

FIG. 8 is a flowchart showing the process flow of the refresh and garbage collection switching determination module 123.

If the number of errors occurred in the garbage collection by the garbage collection controller 125 is greater than or equal to a threshold value (S101: YES), the refresh and garbage collection switching determination module 123 determines whether the NAND memory is disabled in NAND memory die (nonvolatile memory chip) units or not or the number of free blocks is less than a certain number (S102). If the number of errors occurred in the garbage collection by the garbage collection controller 125 is not greater than or equal to the threshold value (S101: NO) or if the NAND memory is disabled in NAND memory die (nonvolatile memory chip) units or the number of free blocks is less than the certain number (S101: YES), the process ends.

If the NAND memory is not disabled in NAND memory die (nonvolatile memory chip) units or if the number of free blocks is greater than or equal to the certain number (S102: NO), the refresh and garbage collection switching determination module 123 notifies the garbage collection controller 125 to stop the garbage collection (S103). The refresh and garbage collection switching determination module 123 notifies the refresh controller 124 of the block in which the number of errors occurred is greater than or equal to the threshold value (S104). As a result, the block is switched to a block to be subjected to the garbage collection by the refresh controller 124. Subsequently, the refresh and garbage collection switching determination module 123 notifies the garbage collection controller 125 to resume the garbage collection (S105).

Consequently, in the memory system 1 according to the present embodiment including the refresh and garbage collection switching determination module 123, in the garbage collection for free block allocation, if an error occurs at a time of reading data in a certain block and correction of the error takes a long time, the block can be switched to the garbage collection for the refresh. Therefore, the garbage collection for free block allocation can be completed within a predetermined time, and stagnation of the host write operation can be prevented.

In addition, under certain conditions, for example, in a case where a chip unit error occurs or in a case where the number of free blocks is less than a certain number, the process of switching the block from the garbage collection for free block allocation to the garbage collection for the refresh is prevented. Consequently, the garbage collection for the refresh can be committed to the recovery of data on the disabled NAND memory die (nonvolatile memory chip). In addition, priority can be given to the free block creation over the host write operation, and a free block can be immediately created.

Note that the number of one or both of the refresh controller 124 and the garbage collection controller 125 may be two or more as described above. For example, if there are two garbage collection controllers 125, different execution cycles (execution interval) may be different from each other. When an error occurs at the time of reading data in the garbage collection having the shorter execution cycle, the block may be switched not to the refresh controller 124 but to the garbage collection having the other execution cycle, that is, the longer execution cycle.

In the process of switching the block from the garbage collection controller 125 to the refresh controller 124, there may be the following demerit. That is, cold data which is to be relocated for the purpose of preservation by the refresh controller 124 may be mixed with hot data in the block which is switched from the garbage collection controller 125.

By switching the block from the garbage collection having the shorter execution cycle to the garbage collection having the longer execution cycle, this demerit can be further avoided.

In addition, the refresh and garbage collection switching determination module 123 may further has the function of switching a block from the refresh controller 124 to the garbage collection controller 125.

For example, in a case where a large number of blocks which need the refresh are generated and there is no block having a low valid cluster ratio (except the blocks which need the refresh), the refresh and garbage collection switching determination module 123 executes a process of switching a block from the refresh controller 124 to the garbage collection controller 125. More specifically, the refresh and garbage collection switching determination module 123 selects a block as a candidate along with a block which has already selected as a candidate for a block to be subjected to the refresh by the refresh controller 124, and instructs the garbage collection controller 125 to execute the garbage collection.

As described above, for example, if there are a sufficient number of free blocks, the garbage collection controller 125 may stop the garbage collection. That is, for example, as long as there are a sufficient number of free blocks and a condition where the stop of the garbage collection is prevented (the number of free blocks is less than a certain number, etc.) is satisfied, the garbage collection controller 125 can stop the garbage collection and switch to the refresh. On the other hand, under a condition where the stop of the garbage collection is prevented, the garbage collection controller 125 continues the garbage collection for free block allocation.

That is, when a condition where the stop of the garbage collection is prevented is satisfied and the garbage collection for free block allocation is continued, if the garbage collection controller 125 receives an instruction from the refresh and garbage collection switching determination module 123, the garbage collection controller 125 may mix a block which needs the refresh with a candidate, and execute the garbage collection also for the purpose of the refresh of the block, that is, the garbage collection for the refresh.

Figure 9:
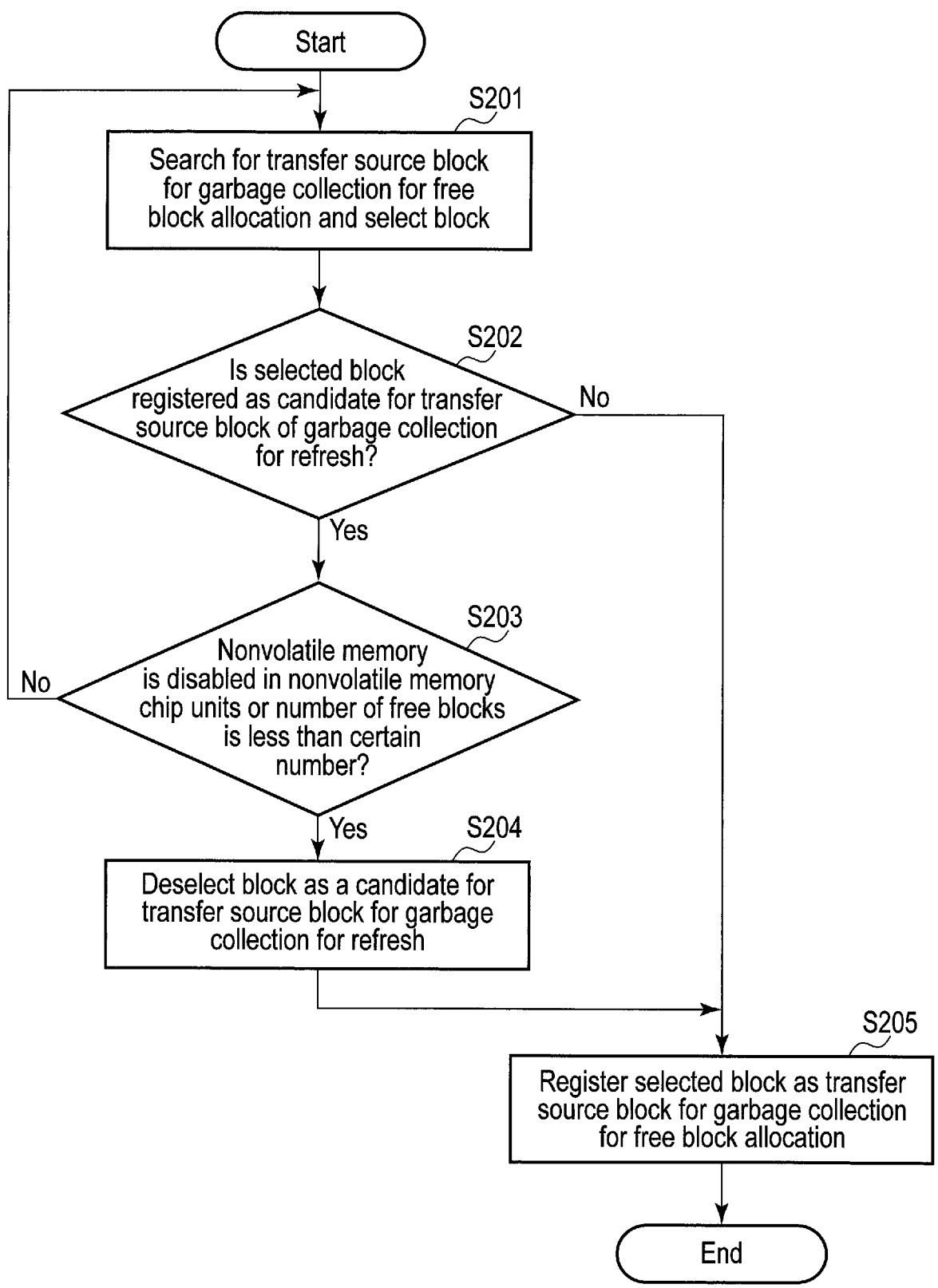
FIG. 9 is a flowchart showing a process flow in a case where garbage collection to be executed for the purpose of free block allocation is executed for the purpose of refresh in the memory system of the present embodiment.

FIG. 9 is a flowchart showing the process flow of the garbage collection controller 125 when receiving, from the refresh and garbage collection switching determination module 123, an instruction to select a block as a candidate along with a block which has already selected as a candidate for a block to be subjected to the refresh by the refresh controller 124 and to execute the garbage collection.

The garbage collection controller 125 searches for a transfer source block of the garbage collection and selects the block (S201). The garbage collection controller 125 determines whether the selected block is registered as a candidate for a transfer source block of the garbage collection of the refresh controller 124 (S202).

If the selected block is registered (S202: YES), the garbage collection controller 125 determines whether the NAND memory is disabled in NAND memory die (nonvolatile memory chip) units or not or whether the number of free blocks is less than a certain number or not (S203). If the NAND memory is disabled in NAND memory die (nonvolatile memory chip) units or the number of free blocks is less than the certain number (S203: YES), the garbage collection controller 125 deselects the block as a candidate for the refresh controller 124 via the block manager 121 (S204) and registers the block as its own transfer source block (S205).

On the other hand, if the NAND memory is not disabled in NAND memory die (nonvolatile memory chip) units and the number of free blocks is greater than or equal to the certain number (S203: NO), it is unnecessary to execute the garbage collection by mixing a block which needs the refresh with a candidate, and therefore the process returns to step S201 and the garbage collection controller 125 selects a transfer source block again. In addition, if the selected block is not registered as a transfer source block of the garbage collection of the refresh controller 124 (S202: NO), the garbage collection controller 125 registers the block as its own transfer source block regardless of whether a condition where the stop of the garbage collection is prevented is satisfied or not (S205).

Note that, if the garbage collection controller 125 receives, from the refresh and garbage collection switching determination module 123, an instruction to execute the garbage collection by including a block selected as a block to be subjected to the refresh, for example, with regard to a block including data in which an error has occurred, the garbage collection controller 125 should preferably select a block in the increasing order of correction time, a block having the shortest correction time first, or in the increasing order of valid cluster ratio, a block having the lowest valid cluster ratio first. The former case prevents stagnation of the host write operation, and the latter case improves the efficiency of free block creation.

As described above, the memory system 1 of the present embodiment includes the refresh controller 124 which executes the garbage collection for the refresh, the garbage collection controller 125 which executes the garbage collection for free block allocation, and the refresh and garbage collection switching determination module 123 which appropriately switches between a block selected as a candidate for a transfer source by the refresh controller 124 and a block selected as a candidate for a transfer source by the garbage collection controller 125, and appropriately prevents this switching process, and therefore the memory system 1 of the present embodiment can efficiently execute the garbage collection.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory including a plurality of blocks; and
   a controller configured to control an operation of writing data to the nonvolatile memory and an operation of reading data to the nonvolatile memory, wherein:
   the controller comprises:
   a first processor configured to execute a first process of creating one or more free blocks by transferring valid data in N blocks (where N is a natural number greater than or equal to two) to blocks of number less than N;
   a second processor configured to execute a second process of transferring valid data including data which needs refresh in M blocks (where M is a natural number greater than or equal to one) to blocks of number less than or equal to M; and
   a control module configured to stop the first process and switch a block selected as a transfer source block of valid data to a candidate for the second process, when a condition is satisfied during execution of the first process.

2. The memory system of claim 1, wherein:
   the first processor and the second processor are capable of operating in parallel with each other; and
   a candidate for a transfer source block of valid data and a candidate for a transfer destination block of the valid data are managed in the first processor and the second processor independently of each other such that a same block is not selected as a transfer source block of valid data or a transfer destination block of valid data in an overlapping manner in the first process and the second process.

3. The memory system of claim 1, wherein the first processor is configured to adjust an execution cycle of the first process based on an execution ratio between an operation of writing data in response to a request from a host device and an operation of writing data for the first process.

4. The memory system of claim 1, wherein the first processor is configured to select a block having a small proportion of valid data to total data as a candidate for a transfer source block of valid data.

5. The memory system of claim 1, wherein the second processor is configured to adjust an execution cycle of the second process based on a number of blocks including data which needs the refresh, independently of an operation of writing data in response to a request from a host device.

6. The memory system of claim 1, wherein the second processor is configured to adjust an execution cycle of the second process based on severity of an error which necessitates the refresh or an amount of blocks which need the refresh, independently of an operation of writing data in response to a request from a host device.

7. The memory system of claim 1, wherein the second processor is configured to select a block including valid data which is not used for more than a first period or a block which needs the refresh, as a candidate for a transfer source block of valid data.

8. The memory system of claim 1, wherein the condition includes a case where the number of free blocks is greater than or equal to a first number.

9. The memory system of claim 1, wherein:
   the nonvolatile memory includes a plurality of nonvolatile memory chips; and
   the condition includes a case where the nonvolatile memory is not disabled in nonvolatile memory chip units.

10. The memory system of claim 1, wherein the second processor is configured to select a block including data which needs error correction in order of severity of an error of the data which needs error correction, as a block to be subjected to the second process, from among the switched block and a block selected as a candidate for the second process.

11. The memory system of claim 1, wherein the second processor is configured to select a block including valid data in ascending order of the amount of valid data, as a block to be subjected to the second process, from among the switched block and a block selected as a candidate for the second process.

12. The memory system of claim 1, wherein the control module is configured to switch a block including data which needs the refresh and selected as the candidate for the second process from the candidate for the second process to a candidate for the first process, when the number of blocks each including data which needs the refresh and each selected as the candidate for the second process is greater than or equal to a first value, and a block which has a proportion of valid data to total data smaller than a second value and should be selected as a candidate for the first process does not exist.

13. The memory system of claim 12, wherein the first processor is configured to select a block which includes data which needs error correction and could be the candidate for the second process in increasing order of severity of data error as a block to be subjected to the first process.

14. The memory system of claim 12, wherein the first processor is configured to select a block which could be the candidate for the second process in ascending order of the amount of valid data as a block subjected to the first process.

15. The memory system of claim 1, wherein the control module is configured to switch a block including data which needs the refresh and selected as the candidate for the second process from the candidate for the second process to a candidate for the first process, when the number of free blocks is less than a third value and a block which has a proportion of valid data to total data smaller than a fourth value and should be selected as the candidate for the first process does not exist.

16. The memory system of claim 15, wherein:
the nonvolatile memory includes a plurality of memory chips; and
the control module is configured to deselect a block which needs refresh of valid data as a block to be switched from the candidate for the second process to the candidate for the first process, the refresh of valid data being necessitated when the nonvolatile memory is disabled in memory chip units.

17. The memory system of claim 1, wherein the control module is configured to stop the first process when the number of errors occurred in the valid data which are read during execution of the first process is greater than a fifth value.

18. The memory system of claim 1, wherein:
the first processor includes a third processor and a fourth processor, the third processor executes the first process in a first interval, and the fourth processor executes the first process in a second interval longer than the first interval; and
the memory system further comprises a control module configured to stop the first process and switch a block selected as a transfer source block of valid data to a candidate for the first process which the fourth processor executes in the second interval, when a second condition is satisfied during execution of the first process which the third processor executes in the first interval.

19. A garbage collection control method of a memory system comprising a nonvolatile memory including a plurality of blocks, the method comprising:
executing a first process of creating one or more free blocks by transferring valid data in N blocks (where N is a natural number greater than or equal to two) to blocks of number less than N;
executing a second process of transferring valid data including data which needs refresh in M blocks (where M is a natural number greater than or equal to one) to blocks of number less than or equal to M; and
stopping the first process and switching a block selected as a transfer source block of valid data to a candidate for the second process, when a condition is satisfied during execution of the first process.

20. A memory system comprising:
a nonvolatile memory including a plurality of blocks; and
a controller configured to control an operation of writing data to the nonvolatile memory and an operation of reading data to the nonvolatile memory, wherein:
the controller comprises:
a first processor configured to execute a first process of creating one or more free blocks by transferring valid data in N blocks (where N is a natural number greater than or equal to two) to blocks of number less than N; and
a second processor configured to execute a second process of transferring valid data including data which needs refresh in M blocks (where M is a natural number greater than or equal to one) to blocks of number less than or equal to M,
and wherein
the first processor and the second processor are capable of operating in parallel with each other; and
a candidate for a transfer source block of valid data and a candidate for a transfer destination block of the valid data are managed in the first processor and the second processor independently of each other such that a same block is not selected as a transfer source block of valid data or a transfer destination block of valid data in an overlapping manner in the first process and the second process.

* * * * *